United States Patent [19]
Luchier et al.

[11] 3,858,692
[45] Jan. 7, 1975

[54] VEHICLE WHEEL BRAKE

[76] Inventors: Jean-Jacques Luchier; Philippe Luchier, both of 14, rue Berthelot, Domont, France

[22] Filed: June 11, 1973

[21] Appl. No.: 368,967

[30] Foreign Application Priority Data
June 13, 1972 France .................. 72.21185

[52] U.S. Cl. .............. 188/366, 188/18 A, 188/72.4, 192/85 AA
[51] Int. Cl. .............................................. B60t 1/06
[58] Field of Search ...... 188/18 A, 71.1, 72.4, 72.5, 188/344, 366; 192/85 AA, 85 CA

[56] References Cited
UNITED STATES PATENTS

| | | | |
|---|---|---|---|
| 2,082,277 | 6/1937 | Dierfeld | 188/366 |
| 2,386,477 | 10/1945 | Kraft | 188/72.4 |
| 2,581,941 | 1/1952 | Skinn et al. | 188/366 |
| 2,589,291 | 3/1952 | Sanford | 188/366 |
| 2,711,802 | 6/1935 | Davis | 188/72.4 |
| 2,975,598 | 3/1961 | Carlson | 188/366 |
| 3,115,952 | 12/1963 | Erickson | 188/72.4 |

*Primary Examiner*—Trygve M. Blix
*Assistant Examiner*—Edward Kazenske

[57] ABSTRACT

A fluid operated brake for vehicle wheels is disclosed. The brake device includes cooperating lined faces on the opposite sidewalls of the rotatable wheel hub and on brake plate members disposed outwardly with respect to the hub sidewalls. The brake plate members are moved into engagement with the hub sidewalls by fluid operated jacks which include stationary pistons and movable cylinder defining members; the pistons and cylinder defining members being coaxial with the axle.

6 Claims, 3 Drawing Figures

VEHICLE WHEEL BRAKE

BACKGROUND OF THE INVENTION:

1. Field of the Invention

The present invention relates to vehicle wheel brakes. More specifically, this invention is directed to a fluid controlled brake particularly well suited for use on motorcycles. Accordingly, the general objects of the present invention are to provide novel and improved apparatus of such character.

2. Description of the Prior Art

While not limited thereto in its utility, the present invention is particularly well suited for use on motorcycles. There are, in the prior art, numerous different types of drum or disc brake systems available for use on motorcycles. These prior art brake systems are usually very complicated and thus expensive. Additionally, prior art brake systems adaptable for use on motorcycles have the disadvantage that, when the wheel with which the brake is associated has to be removed from the vehicle, it is also necessary to dismantle the brake control members. Dismantling of the brake control members, in turn, necessitates adjustment of the brake during refitting of the wheel to the vehicle. As a consequence of the complicated dismantling procedure and the requirement for readjustment upon reassembly, hydraulic controls for motorcycle brakes have generally been abandoned in favor of mechanical cam-operated controls. Such mechanical controls are, however, rather heavy and complex since they must be provided with resetting means.

SUMMARY OF THE INVENTION:

The present invention overcomes the above briefly discussed and other deficiencies and disadvantages of the prior art by providing a fluid controlled vehicle wheel brake which does not require disassembly or adjustment during removal and refitting of the vehicle wheel with which the brake device is associated. A brake in accordance with the present invention is characterized by reliability, lightweight and is not unduly expensive whereby the invention is particularly well suited for use on motorcycles.

A brake device in accordance with the present invention comprises at least one annular flange integral with the hub of the wheel to be braked. The hub is rotatably mounted on a pin or axle supported, in the case of a motorcycle, by the ends of the prongs of a fork member. A lining material having a high coefficient of friction is provided on the outer lateral face of the annular flange. This lining material cooperates with a corresponding lining provided on a movable annular plate positioned adjacent to but normally displaced from the annular flange; the plate being restrained from rotational movement. When braking is desired the plate may be moved axially the requisite short distance, under the influence of a pressurized fluid, whereby contact between the linings will occur.

The movable brake plate member of the present invention is, in a preferred embodiment, connected by ribs to a cylinder defining ring member. A fixed position piston is disposed in the cylinder in the ring member. Means are provided for delivering pressurized fluid to the cylinder of the ring members at a first side of the fixed position piston whereby the ring member and thus the brake plate member will move thereby resulting in contact between the plate lining and the lining on the annular flange.

Since the linings on the flange and brake plate have a high coefficient of friction and large areas of contact when braking is commanded, the fluid pressure required to operate a brake in accordance with the present invention is comparatively low thus permitting simplification of the hydraulic controls means. Also, through the use of a fluid control, it is possible to minimize movements of the brake plate since no complicated and expensive mechanical means are required to reset the plate after braking; resetting being effected as a result of the release forces provided by the O-ring seals located between the piston and cylinder and resiliently deformed during braking. Accordingly, all of the conventional resetting elements, such as springs and the like, are eliminated in the case of the present invention thereby providing a brake which is lighter in weight, less complicated and thus more reliable.

Also in accordance with the present invention the dismantling of a wheel including the novel brake may be accomplished rapidly and easily. During dismantling removal of the piston from the cylinder in the ring member is prevented by stop means provided on the pistons and therefore no leakage of brake fluid will occur.

In accordance with a further novel feature of the invention the annular flange which cooperates with the brake plate is integral with and connected to the wheel hub by means of radial fins. Additionally, a plurality of vanes are provided between the radial fins. The fins and vanes promote and insure effective ventilation and thus abnormal heating during prolonged use of the brake device is avoided.

Another feature of the invention, in a prefereed embodiment, resides in the fact that the novel brake system may be symmetrical. That is, a system in accordance with the invention may comprise two brake plates which cooperate with corresponding annular flanges on opposite sides of the wheel hub whereby the entire brake assembly is balanced and no lateral reaction occurs either in the brake assembly or on the wheel during braking.

BRIEF DESCRIPTION OF THE DRAWING:

The present invention may be better understood and its numerous objects and advantages will become apparent to those skilled in the art by reference to the accompanying drawing wherein like reference numerals refer to like elements in the several figures and in which.

Figure 1:
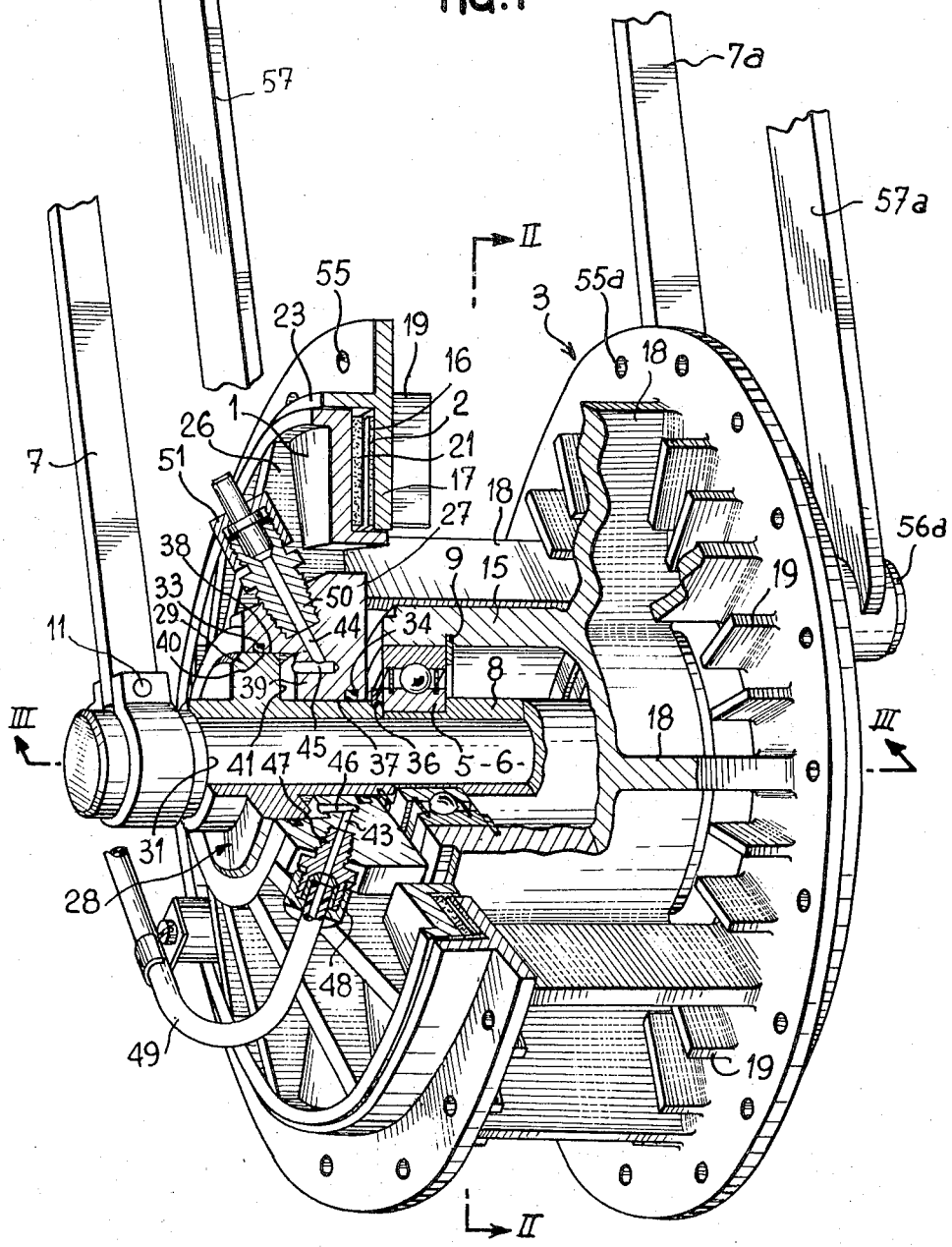
FIG. 1 is s perspective view, partly in section, of a preferred embodiment of a brake according to the present invention.

DESCRIPTION OF THE PREFERRED EMBODIMENT:

As previously noted, while not limited thereto in its utility, the present invention is particularly well suited for use on vehicles such as motorcycles. Thus, referring jointly to all three FIGURES, the invention is shown in the environment of the front wheel of a motorcycle. A wheel brake in accordance with the invention comprises a pair of oppositely disposed brake plates 1 and 1a which, in the manner to be described below, cooperate with respective annular faces 2 and 2a of the wheel hub; the hub being indicated generally at 3.

The hub 3 is supported, in the manner to be described below, for rotation about an axle or pin 6. The pin 6 is, in turn, supported adjacent its opposite ends in the two prongs 7 and 7a of the steering fork of the motorcycle. Thus, one end of the pin 6 is clamped to the prong 7 of the fork by means of bolt 11 and an associated clamp while the other end 12 of pin 6 is threaded and screwed into a threaded sleeve integral with prong 7a of the steering fork.

Figure 3:
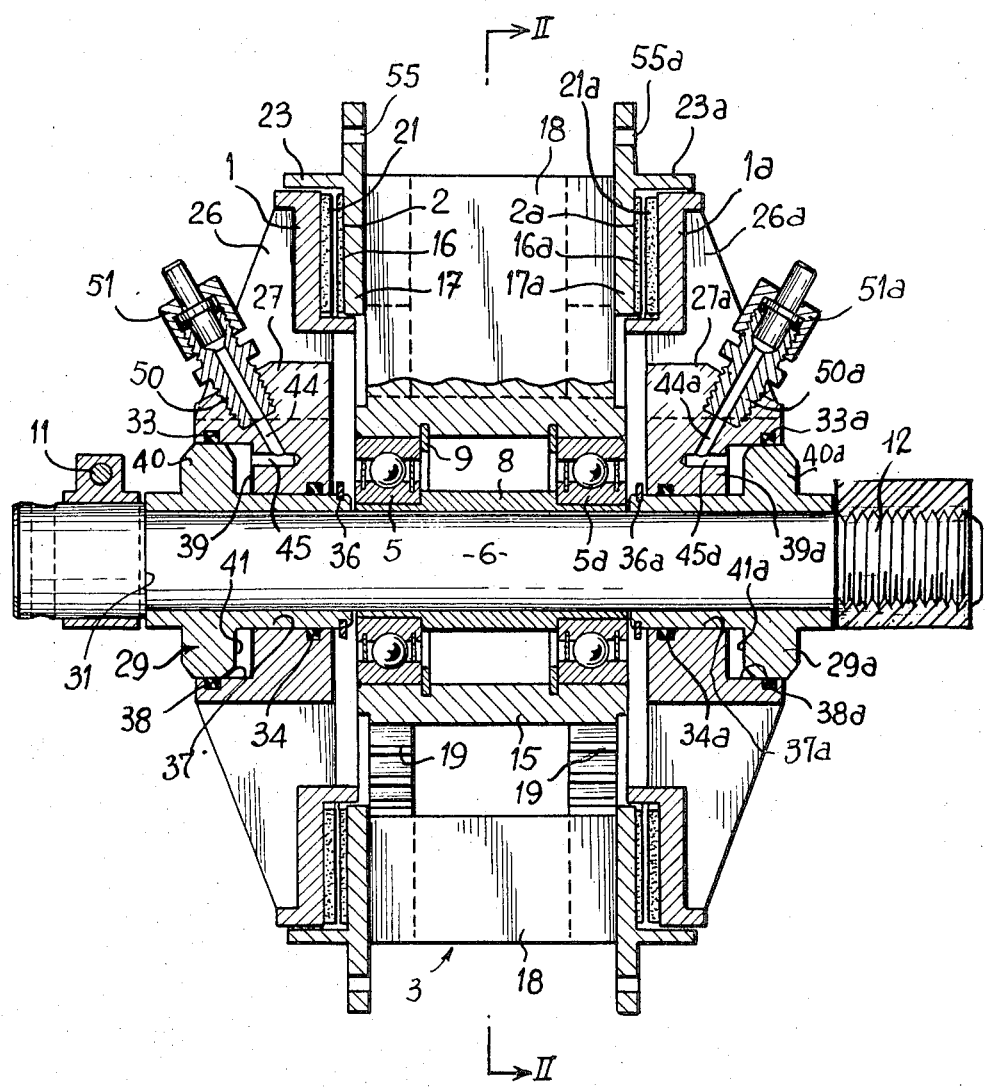
FIG. 3 is a further cross-sectional view of the preferred embodiment of the invention taken along line III—III of FIG. 1.

The hub 3 is supported on pin 6 by means of a tubular sleeve member 8 and a pair of waterproof ball bearings 5 and 5a. Bearings 5 and 5a are positioned against shoulders defined by end portions of sleeve 8 of reduced diameter and the bearings are maintained in the proper axial position in the manner most clearly seen from FIG. 3. Stop members 9 are provided on a cylindrical central portion 15 of hub 3 and contact the outer rings of the bearings 5 and 5a to thus aid in the positioning thereof.

As previously noted, the hub 3 includes a pair of annular faces 2 and 2a; these faces being defined on lateral sidewalls 17 and 17a of the hub. The walls 17 and 17a have a central opening with a diameter which is greater than the external diameter of the cylindrical portion 15 of the hub 3. The walls 17 and 17a are interconnected and are also connected to cylindrical portion 15 of hub 3 by means of radial fins 18 as may best be seen from a joint consideration of FIGS. 1 and 2; fins 18 being integral with walls 17 and 17a at the side thereof disposed opposite to annular faces 2 and 2a. A plurality of integral small vanes 19 also extend inwardly toward one another from sidewalls 17 and 17a.

The annular faces 2 and 2a of the sidewalls 17 and 17a of hub 3 are each provided with a covering layer of a suitable brake lining material having a high coefficient of friction; the linings being indicated at 16 and 16a. Immediately above the radially outwardly disposed ends of the linings 16 and 16a the hubs sidewalls are provided with outwardly extending flanges 23 and 23a which define annular rims. These annular rims function as deflectors to protect the linings from dirt and splashing water.

The brake plates or discs 1 and 1a are also annular in shape and have an inner diameter which is greater than the external diameter of the central portion 15 of hub 3. The brake plates 1 and 1a are connected to respective ring members 27 and 27a by means of fins 26 and 26a. As may best be seen from a joint consideration of FIGS. 1 and 3, a plurality of openings are defined by fins 26 and 26a between plates 1 and 1a and their associated ring members 27 and 27a. These openings are located opposite to similar openings formed in the hub 3 between the cylindrical portion 15 and sidewalls 17; the hub openings thus being defined in part by the fins 18. The opposed openings permit the induced circulation of air, in an axial direction, from the outside to the inside of the hub; the thin streams of air flowing out between the fins 18 in the centrifugal direction.

The brake plates 1 and 1a are respectively provided with covering layers 21 and 21a of a suitable lining material having a high coefficient of friction; linings 21 and 21a being commensurate in size and shape with the linings 16 and 16a on hub sidewalls 17 and 17a.

Figure 2:
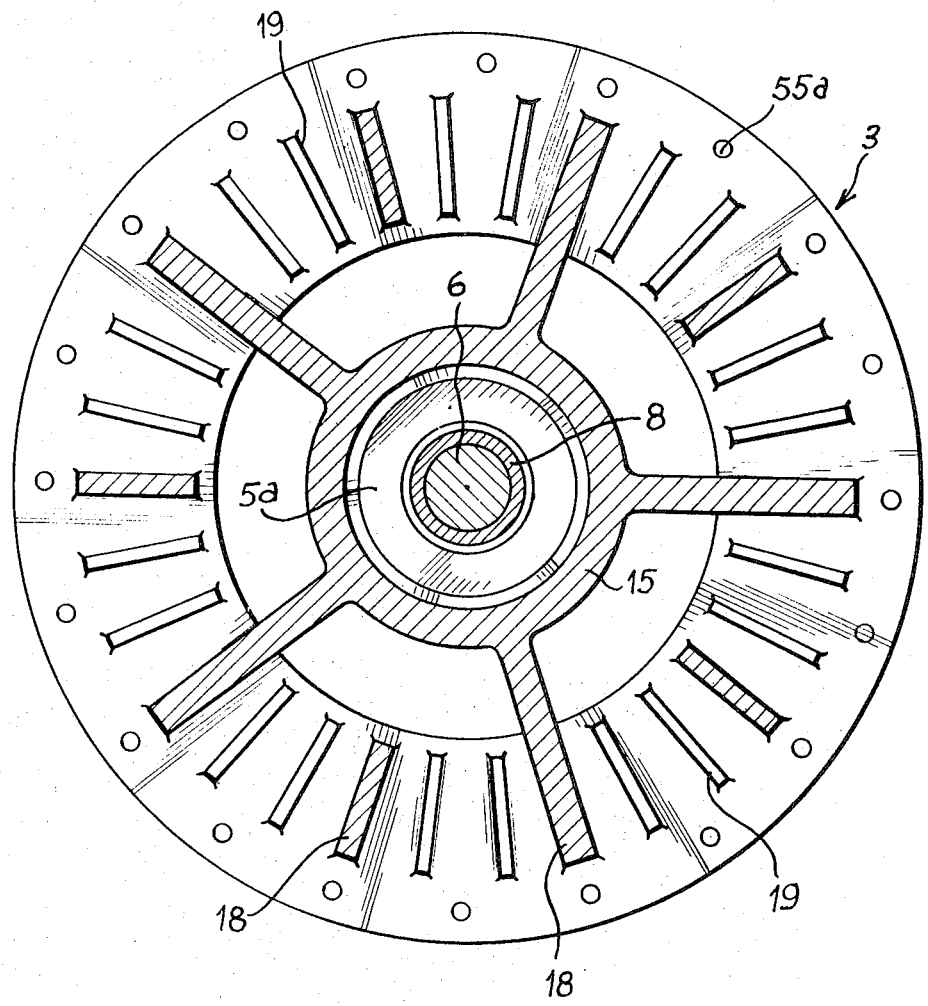
FIG. 2 is a cross-sectional side elevation view, through a vertical plane II—II perpendicular to the axle of the wheel with which the brake is associated, of the embodiment of FIG. 1.

The ring members 27 and 27a define, in a manner to be described in more detail below, the cylinders of a pair of hydraulic jacks; one of said jacks being indicated generally at 28 in FIG. 1. As will be described below in a discussion of the operation of the disclosed brake, the cylinder defining ring members 27 and 27a are movable with respect to cooperating stationary piston members 29 and 29a. The piston members 29 and 29a are secured to pin 6 and are respectively located between the opposite ends of the tubular member 8 and the bracket by which the fork prong 7 is attached to pin 6 and the threaded sleeve by which fork prong 7a is connected to pin 6. The piston members 29 and 29a are respectively provided with grooves which receive resilient stop members 36 and 36a. The stop members 36 and 36a serve to limit the stroke of the hydraulic jacks and thus limit the degree of wear of linings 21, 21a, 16 and 16a.

The ring members 27 and 27a define stepped cylinders having first smaller diameter portions 37 and 37a and larger diameter portions 38 and 38a outwardly disposed relative to portions 37 and 37a; the stepped portions of the cylinders defined in ring members 27 and 27a being interconnected by means of respective shoulders 39 and 39a. The smaller diameter portions 37 and 37a of the stepped cylinders have a diameter equal to the external diameter of the "rod" portions of the piston members and are provided with grooves for receiving respective O-ring seals 34 and 34a. The O-ring seals are resilient and insure a fluid tight connection between the piston members and ring members.

The piston members 29 and 29a are respectively provided with head or piston portions 40 and 40a of cylindrical shape. Piston heads 40 and 40a have a diameter equal to that of the larger diameter portions 38 and 38a of the cylinders in ring members 27 and 27a. The heads 40 and 40a are connected to the body or rod portions of respective piston members 29 and 29a by means of respective shoulders 41 and 41a. The larger diameter portions 38 of the cylinders in ring members 27 are also provided with grooves which receive O-rings 33, 33a. As in the case of O-ring members 34, the seals 33 are resilient and insure a fluid tight connection between the piston members and cooperating cylinder defining members.

Each of the cylinder defining ring members 27 and 27a is provided with a pair of bores which provide communication between the exterior of the ring members and the region between the piston heads 40 and shoulders 39. These bores are indicated at 43 and 44 in ring 27 and 43a and 44a in ring member 27a. Referring to FIG. 1, the bores 43 communicate with the face of shoulders 39 by means of blind holes 46 whereas, as may be seen from FIGS. 1 and 3, the bores 44 communicate with the faces of shoulders 39 via blind holes 45 and 45a. The bores 43-43a comprise threaded holes 47-47a receive hose connectors 48-48a. The exposed ends of hose connectors 48-48a are connected, by means of respective hoses 49-49a, to a control for delivering fluid under pressure to the brake device.

The bores 44 and 44a are defined in part by respective threaded holes 50 and 50a which receive respective bleeding devices 51 and 51a. The bleed devices 51 are arranged on an angle relative to the hose connectors 48 so as to be upwardly inclined with respect thereto in the interest of insuring complete bleeding of air introduced into the hydraulic jacks.

Adjacent their circumference, the sidewalls 17 and 17a of hub 3 are provided with holes 55, 55a for receiving spokes or arms which connect the hub 3 to the rim. Also, the plates 1 and 1a comprises heads 56 and 56a, head 56a only being shown, which permit the brake plates to be connected to corresponding heads on the fork my means of struts 57 and 57a in order to immobilize the plates against rotation when the wheel rotates.

In operation, when fluid is delivered under pressure from the manual or foot control to hoses 49–49a, brake fluid will flow into the area between the facing shoulders 41–41a of the piston members and 39–39a of the cylinders in ring members 27–27a. Since the piston members 29–29a are locked in position on pin 6, the pressurized fluid tends to separate shoulders 39–39a from cooperating shoulders 41–41a on the pistons 40–40a whereby the brakes plates 1 and 1a will move toward the sidewalls 17, 17a of the hub 3. This movement will bring the linings 16 and 21 into cooperative relationship and cause the wheel to be braked. When the control is released the plates 1 and 1a will return to their starting position. It is to be noted that a brake in accordance with the present invention does not include any resetting means. Such resetting elements are not required because the movement of the plates 1 is very slight and there is no sliding movement of the O-rings 33 and 34. Upon braking, there will be a slight torque applied to the O-rings and sufficient force will thus be provided by the O-rings themselves to return the plate 1 and 1a to their initial position. It is also to be noted that, in view of the friction surfaces of linings 16 and 21, the control fluid pressure necessary to achieve braking does not have to be large thereby substantially reducing the risk of brake fluid leakage.

The above described brake permits the wheel to be dismantled without having to adjust the brakes for refitting. Such a dismantling is accomplished merely by withdrawing the pin 6 and disconnecting struts 57, 57a since the plates 1 and 1a are easily disengaged and the piston members 29, 29a remain adjacent to the ring members 27, 27a.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A brake device for a wheel, the wheel having a hub mounted for rotation about an axle, the hub being characterized by at least a first lateral face lying in a plane perpendicular to the axis about which the wheel rotates, the brake device comprising:

a first layer of lining material having a high coefficient of friction disposed on at least part of the hub first lateral face;

annular brake plate means, said brake plate means being axially movable with respect to the hub and having a first face which is normally in opposed parallel spaced relationship to said first layer of said lining material on the hub first lateral face, said brake plate means being coaxial with the axle;

a second layer of lining material having a high coefficient of friction disposed on at least part of said brake plate means first face so as to normally be in registration with and spaced from said first layer of lining material;

cylinder defining means, said cylinder defining means having a first cylindrical bore of first diameter and a second cylindrical bore of greater diameter than said first bore, said first and second bores being in communication with one another and being both coaxial with the axle, the junction between said bores defining a radially extending shoulder, said cylinder defining means being disposed inwardly toward the axle with respect to said brake plate means;

a plurality of radially extending ribs rigidly connecting said cylinder defining means to said brake plate means, said ribs in part defining a plurality of passages between said plate means and said cylinder defining means;

a piston having a cylindrical body portion and a cylindrical first portion of increased diameter extending from said body portion, said piston body portion diameter being commensurate with the diameter of said cylinder defining means first bore whereby said piston may be operatively associated with said cylinder defining means with said first portion being disposed in said second bore and said piston body portion extending through said first bore, said piston further having a cylindrical bore commensurate in diameter with the diameter of the axle whereby the piston may be installed on the axle;

means for preventing translational movement of said piston on the axle;

stop means affixed to said piston body portion for limiting translational movement of said cylinder defining means with respect to said piston;

resilient seal means disposed between said cylinder defining means and said piston; and means for delivering fluid under pressure to said cylinder defining means second bore between said cylinder defining means shoulder and said piston whereby said cylinder defining means may be caused to move axially to produce contact between said first and second layers of lining material.

2. The apparatus of claim 1 wherein said resilient seal means comprises:

first and second O-rings disposed in grooves respectively in the first and second cylindrical bores of said cylinder defining means.

3. The apparatus of claim 1 wherein said fluid delivering means includes:

a bore through said cylinder defining means through which pressurized fluid may be delivered to the second coaxial cylindrical bore intermediate said shoulder and said piston first portion.

4. The apparatus of claim 1 further comprising:

means for preventing rotation of said brake plate means.

5. The apparatus of claim 1 wherein the hub comprises:

an annular sleeve;

means mounting said sleeve for rotation about the axle;

a pair of annular sidewall defining members, one of said sidewall members including said first lateral face and the other sidewall defining member including a second lateral face, said first and second lateral faces facing outwardly; and a plurality of radial fins interconnecting said sidewall defining members and said sleeve.

6. The apparatus of claim 5 further comprising:

a third layer of lining material having a high coefficient of friction disposed on at least part of the hub second lateral face;

second movable annular brake plate means, said second brake plate means having a first face which is normally in opposed parallel spaced relationship to said third layer of said lining material on the hub second lateral face, said second brake plate means being coaxial with the axle;

a fourth layer of lining material having a high coefficient of friction disposed on at least part of said second brake plate means first face so as to normally be in registration with and spaced from said third layer of lining material;

second annular cylinder defining means, said cylinder defining means being coaxial with the axle and axially moveable with respect thereto, said second cylinder defining means being positioned on the opposite side of the hub with respect to said first cylinder defining means;

means rigidly connecting said second cylinder defining means to said second brake plate means;

second piston mounted on the axle, said second piston having at least a first portion which is received in said second cylinder defining means cylinder;

resilient seal means disposed between said second cylinder defining means and said second piston; and means for delivering fluid under pressure to said second cylinder defining means cylinder at a first side of said second piston first portion whereby said second cylinder defining means may be caused to move axially to produce contact between said third and fourth layers of lining material.

* * * * *